United States Patent

Güntherberg et al.

Patent Number: 5,877,258
Date of Patent: Mar. 2, 1999

[54] THERMOPLASTIC MOLDING MATERIALS

[75] Inventors: Norbert Güntherberg, Speyer; Martin Weber, Neustadt; Freddy Gruber, Offenbach; Gerhard Lindenschmidt, Leimen, all of Germany

[73] Assignee: BASF Aktiengesellschaft, Ludwigshafen, Germany

[21] Appl. No.: 740,212

[22] Filed: Oct. 25, 1996

Related U.S. Application Data

[63] Continuation of Ser. No. 542,182, Oct. 12, 1995, abandoned.

[30] Foreign Application Priority Data

Oct. 20, 1994 [DE] Germany ............... 44 37 501.8

[51] Int. Cl.$^6$ ............... C08L 51/04; C08L 53/02
[52] U.S. Cl. ............... 525/71; 525/85; 525/902; 525/74
[58] Field of Search ............... 525/71, 85, 902, 525/74

[56] References Cited

U.S. PATENT DOCUMENTS

| | | | |
|---|---|---|---|
| 3,907,930 | 9/1975 | O'Grady | 525/71 |
| 4,634,732 | 1/1987 | Miller et al. | 524/504 |
| 5,342,898 | 8/1994 | Jeitz et al. | 525/281 |
| 5,446,094 | 8/1995 | Weber et al. | 525/93 |

FOREIGN PATENT DOCUMENTS

| | | |
|---|---|---|
| 318 793 | 6/1989 | European Pat. Off. |
| 526 813 | 2/1993 | European Pat. Off. |
| 2250802 | 6/1975 | France |
| 42 11 412 | 10/1993 | Germany |

OTHER PUBLICATIONS

*Chem. Abst.*, Abs. 123: 58 235 (English abstract of JP–A 07082387, Mar. 28, 1995.

Primary Examiner—Mark L. Warzel
Attorney, Agent, or Firm—Keil & Weinkauf

[57] ABSTRACT

Thermoplastic molding materials comprise
A) from 30 to 98% by weight of a graft polymer of
  $a_K$) from 30 to 90% by weight of an elastomeric graft core, obtainable by copolymerization of
   $a_K/1$) from 80 to 99.99% by weight of a $C_1$–$C_{10}$-alkyl ester of acrylic acid,
   $a_K/2$) from 0.01 to 20% by weight of a crosslinking monomer and
   $a_K/3$) from 0 to 40% by weight of one or more further monomers, and
  $a_S$) from 10 to 70% by weight of a graft shell of
   $a_S/1$) from 50 to 100% by weight of a styrene compound of the general formula

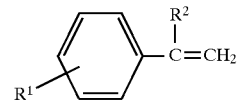

where $R^1$ and $R^2$ are each hydrogen or $C_1$–$C_8$-alkyl, and/or of a $C_1$–$C_8$-alkyl ester of acrylic acid or methacrylic acid, and
   $a_S/2$) from 0 to 50% by weight of one or more further monomers,
B) from 1 to 50% by weight of a thermoplastic polymer of
  $b_1$) from 50 to 100% by weight of styrene and/or α-methylstyrene,
  $b_2$) from 0 to 50% by weight of acrylonitrile and
  $b_3$) from 0 to 50% by weight of one or more further monomers, and
C) from 1 to 70% by weight of a copolymer of
  $c_1$) from 30 to 90% by weight of styrene and/or α-methylstyrene,
  $c_2$) from 10 to 70% by weight of butadiene and
  $c_3$) from 0 to 30% by weight of one or more further monomers,
in which all or virtually all of the olefinic double bonds have been hydrogenated.

8 Claims, No Drawings

THERMOPLASTIC MOLDING MATERIALS

This application is a continuation of application Ser. No. 08/542,182, filed on Oct. 12, 1995 now abandoned.

The present invention relates to thermoplastic molding materials comprising

A) from 30 to 98% by weight of a graft polymer of
  $a_K$) from 30 to 90% by weight of an elastomeric graft core, obtainable by copolymerization of
    $a_K/1$) from 80 to 99.99% by weight of a $C_1$–$C_{10}$-alkyl ester of acrylic acid,
    $a_K/2$) from 0.01 to 20% by weight of a crosslinking monomer and
    $a_K/3$) from 0 to 40% by weight of one or more further monomers, and
  $a_S$) from 10 to 70% by weight of a graft shell of
    $a_S 1$) from 50 to 100% by weight of a styrene compound of the general formula

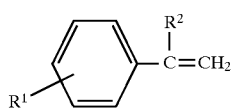

where $R^1$ and $R^2$ are each hydrogen or $C_1$–$C_8$-alkyl, and/or of a $C_1$–$C_8$-alkyl ester of acrylic acid or methacrylic acid, and
    $a_S/2$) from 0 to 50% by weight of one or more further monomers, B) from 1 to 50% by weight of a thermoplastic polymer of
  $b_1$) from 50 to 100% by weight of styrene and/or α-methylstyrene,
  $b_2$) from 0 to 50% by weight of acrylonitrile and
  $b_3$) from 0 to 50% by weight of one or more further monomers, and c) from 1 to 70% by weight of a copolymer of
  $c_1$) from 30 to 90% by weight of styrene and/or -methylstyrene,
  $c_2$) from 10 to 70% by weight of butadiene and
  $c_3$) from 0 to 30% by weight of one or more further monomers, in which all or virtually all of the olefinic double bonds have been hydrogenated.

The present invention furthermore relates to molding materials in which the component C is prepared by a special process, the use of these molding materials for the production of films and moldings, and films and moldings consisting of these molding materials.

Plastics films have a wide range of applications. Certain films, in particular flexible films having a leather-like appearance, are used in large amounts in interior design, for example in motor vehicles, or as imitation leather. They are generally produced by calendering or extrusion.

The main component of these films is at present generally polyvinyl chloride (PVC), which contains plasticizers and frequently also other vinyl polymers. However, the films have only limited stability to aging and moreover the plasticizers present are exuded in the course of time.

EP-A 526 813 discloses thermoplastic molding materials comprising a highly crosslinked acrylate rubber having a graft shell of methyl methacrylate or styrene/acrylonitrile, a partially cross-linked acrylate rubber, an ethylene/vinyl acetate copolymer and, if required, a further polymer based on styrene and/or acrylate compounds. However, these materials tend to exhibit undesirable discolorations under the conditions used for shaping, for example for conversion into films.

DE-A 42 11 412 recommends, as film material, mixtures of styrene/acrylonitrile polymers and thermplastics, which have a graft shell comprising an elastomeric polymer. However, the preparation of such graft polymers entails complicated process engineering, so that it is difficult to obtain constant product quality.

The prior patent (according to Clause 54 (3) of the European Patent Convention) WO 95/01400 discloses moldings of a plastic which contains acrylonitrile, styrene and acrylate (ASA) and one or more plasticizers, and the plasticizer may be a hydrogenated three-block copolymer of the styrene/butadiene/styrene type.

The processing properties of the molding materials and the performance characteristics of the moldings are, however, not completely satisfactory.

It is an object of the present invention to provide thermoplastic molding materials which can be readily prepared with constant quality and can be further processed to moldings, especially to films, without loss of quality, for example discolorations.

We have found that this object is achieved by the thermoplastic molding materials defined at the outset.

We have also found molding materials in which the starting polymer of component C was prepared by anionic polymerization. We have furthermore found the use of the polymer blend for the production of films and moldings, and films and moldings consisting of these materials.

The component A) is present in the novel molding materials in an amount of from 30 to 98, preferably from 40 to 90, particularly preferably from 50 to 82, % by weight, based on the sum of components A), B) and C). This component is a particulate graft copolymer which comprises an elastomeric graft core $a_K$) (soft component) and a shell $a_S$) grafted thereon (hard component).

The graft core $a_K$) is present in an amount of from 30 to 90, preferably from 40 to 80, in particular from 50 to 75, % by weight, based on component A).

The graft core $a_K$) is obtained by polymerization of a monomer mixture comprising
  $a_K/1$) from 80 to 99.99, preferably from 85 to 99.5, particularly preferably from 90 to 99, % by weight of a $C_1$–$C_{10}$-alkyl ester of acrylic acid,
  $a_K/2$) from 0.01 to 20, preferably from 0.5 to 10, particularly preferably from 1 to 5, % by weight of a crosslinking monomer and,
  $a_K/3$) from 0 to 20, preferably from 0 to 5, % by weight of one or more further monomers,
the percentages being based on $a_K$).

Particularly suitable alkyl acrylates $a_K/1$) are those which are derived from ethanol, from 2-ethylhexanol and in particlar from n-butanol.

Crosslinking monomers $a_K/2$) are bi- or polyfunctional comonomers, for example butadiene and isoprene, divinyl esters of dicarboxylic acids, for example of succinic acid and adipic acid, diallyl and divinyl ethers of bifunctional alcohols, for example of ethylene glycol and of butane-1,4-diol, diesters of acrylic acid and methacrylic acid with the stated bifunctional alcohols, 1,4-divinylbenzene and triallyl cyanurate. The acrylate of tricyclodecenyl alcohol of the formula

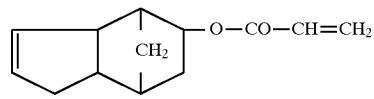

which is known as dihydrodicyclopentadienyl acrylate, and the allyl esters of acrylic acid and of methacrylic acid are particularly preferred.

The component $a_K$) of the molding materials may also contain, at the expense of the monomers $a_K/1$) and $a_K/2$), further monomers $a_K/3$) which vary the mechanical and thermal properties of the core within a certain range. Examples of such monoethylenically unsaturated comonomers are:

vinylaromatic monomers, such as styrene, styrene derivatives of the general formula I

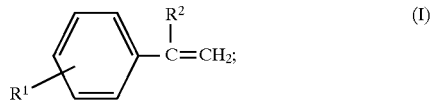

where $R^1$ and $R^2$ are each hydrogen or $C_1$–$C_8$-alkyl;

methacrylonitrile, acrylonitrile;

acrylic acid, methacrylic acid and dicarboxylic acids, such as maleic acid and fumaric acid, and the anhydrides thereof, such as maleic anhydride;

nitrogen-functional monomers, such as dimethylaminoethyl acrylate, diethylaminoethyl acrylate, vinylimidazole, vinylpyrrolidone, vinylcaprolactam, vinylcarbazole, vinylaniline, acrylamide;

$C_1$–$C_4$-alkyl esters of methacrylic acid, such as methyl methacrylate, ethyl methacrylate, n-propyl methacrylate, isopropyl methacrylate, n-butyl methacrylate, isobutyl methacrylate, sec-butyl methacrylate and tert-butyl methacrylate, and hydroxyethyl acrylate;

aromatic and araliphatic esters of acrylic acid and methacrylic acid, such as phenyl acrylate, phenyl methacrylate, benzyl acrylate, benzyl methacrylate, 2-phenylethyl acrylate, 2-phenylethyl methacrylate, 2-phenoxyethyl acrylate and 2-phenoxyethyl methacrylate;

unsaturated ethers, such as vinyl methyl ether, and mixtures of these monomers.

The graft shell $a_S$) is obtained by polymerization of a monomer mixture comprising $a_S/1$) from 50 to 100, preferably from 60 to 95, particularly preferably from 65 to 85, % by weight of a styrene compound of the general formula I

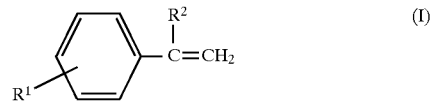

where $R^1$ and $R^2$ are each hydrogen or $C_1$–$C_8$-alkyl, and/or of a $C_1$–$C_8$-alkyl ester of acrylic acid or methacrylic acid and $a_S/2$) from 0 to 50, preferably from 15 to 35, % by weight of one or more further monomers, the percentages being based on $a_S$).

Preferably used styrene compounds of the general formula (I) (component $a_S/1$)) are styrene, α-methylstyrene and furthermore styrenes which are alkylated with $C_1$–$C_8$-alkyl in the nucleus, such as p-methylstyrene or tert-butylstyrene. Styrene is particularly preferred.

$C_1$–$C_8$-Alkyl esters of acrylic acid and/or methacrylic acid, particularly those which are derived from methanol, ethanol, n-propanol, isopropanol, sec-butanol, tert-butanol, isobutanol, pentanol, hexanol, heptanol, octanol and 2-ethylhexanol and especially from n-butanol, are suitable instead of the styrene compounds or as a mixture with them. Methyl methacrylate is particularly preferred.

Furthermore, the shell $a_S$) may be composed of further comonomers $a_S/2$) at the expense of the monomers $a_S/1$).

The recommendations which apply to the component $a_S/2$) are the same as those for the component $a_K/3$), maleic anhydride and N-substituted maleimides, such as N-methyl-, N-phenyl- and N-cyclohexylmaleimide, being examples of further monomers. These and in particular acrylonitrile are preferably used.

The graft shell $a_S$) is preferably composed of styrene or methyl methacrylate or of a mixture of from 40 to 90% by weight of methyl methacrylate and, as the remainder, acrylonitrile or a mixture of from 65 to 85% by weight of styrene and, as the remainder, acrylonitrile.

The graft polymers A) are obtainable in a manner known per se, preferably by emulsion polymerization at from 30° to 80° C. Examples of suitable emulsifiers for this purpose are alkali metal salts of alkylsulfonic or alkylarylsulfonic acids, alkylsulfates, fatty alcohol sulfonates, salts of higher fatty acids of 10 to 30 carbon atoms, sulfosuccinates, ether sulfonates or resin soaps. The alkali metal salts of alkylsulfonates or fatty acids of 10 to 18 carbon atoms are preferably used.

An amount of water sufficient to give the prepared emulsion a solids content of from 20 to 50% by weight is preferably used for the preparation of the emulsion.

Preferred polymerization initiators are free radical donors, for example peroxides, preferably peroxosulfates, and azo compounds, such as azobisisobutyronitrile. However, redox systems, in particular those based on hydroperoxides, such as cumyl hydroperoxide, may also be used. Molecular weight regulators, for example ethylhexyl thioglycolate, tert-dodecyl mercaptan, terpinols and dimeric α-methylstyrene, may be concomitantly used.

Buffer substances, such as $Na_2HPO_4/NaH_2PO_4$ or sodium bicarbonate may be concomitantly used for maintaining a constant pH, which is preferably from 6 to 9.

Emulsifiers, initiators, regulators and buffer substances are used in the conventional amounts, so that further information is unnecessary here.

The graft core can particularly preferably also be prepared by polymerization of the monomers $a_K$) in the presence of a finely divided rubber latex (ie. seed latex polymerization procedure).

In principle, it is also possible to prepare the grafting base by a method other than emulsion polymerization, for example by mass or solution polymerization, and subsequently to emulsify the polymers obtained. Microsupension polymerization is also suitable, oil-soluble initiators, such as lauroyl peroxide and tert-butyl perpivalate, preferably being used. The relevant processes are known.

The reaction conditions are preferably tailored to one another in a manner known per se so that the polymer particles have a very uniform diameter $d_{50}$ of from 60 to 1500 nm, in particular from 150 to 1000 nm.

Instead of the uniform graft polymer A), different polymers of this type, especially those having substantially different particle sizes, may also be used for the preparation of the novel thermoplastic materials. Such mixtures having a bimodal size distribution possess process engineering advantages during further processing. Suitable particle diameters are from 60 to 200 nm on the one hand and from 300 to 1000 nm on the other hand.

Graft polymers having a plurality of soft and hard shells, for example having a structure $a_K$)-$a_S$)-$a_K$)-$a_S$) or $a_S$)-$a_K$)-$a_S$), are also suitable, especially in the case of relatively large particles.

Where ungrafted polymers are formed from the monomers $a_S$) during the grafting procedure, these amounts, which are as a rule less than 10% by weight of $a_S$), are assigned to the mass of component A).

The component B) of the novel molding material is present in an amount of from 1 to 50, preferably from 5 to 40, particularly preferably from 10 to 30, % by weight, based on the sum of the components A), B) and C). The component B) is a thermoplastic polymer which consists of $b_1$) from 50 to 100, preferably from 55 to 95, particularly preferably from 60 to 85, % by weight of styrene or α-methylstyrene, $b_2$) from 0 to 50, preferably from 5 to 45, particularly preferably from 15 to 40, % by weight of acrylonitrile and $b_3$) from 0 to 50, preferably from 0 to 40, % by weight of one or more further monomers, percentages in each case being based on the component B). Suitable monomers $b_3$) are those which were stated for the components $a_K/3$) and $a_S/2$).

Polymers B), which are generally also referred to as SAN polymers owing to their main components being styrene and acrylonitrile, are known, and some of them are also commercially available. They have, as a rule, a viscosity number VN (determined according to DIN 53 726 at 25° C. in a 0.5% strength by weight solution in dimethylformamide) of from 40 to 160 ml/g, corresponding to an average molecular weight of from about 40,000 to 200,000. They are obtained in a known manner by mass, solution, suspension, precipitation or emulsion polymerization. Details of these processes are described, for example, in Kunststoffhandbuch, editors R. Vieweg and G. Daumiller, Vol. V Polystyrol, Carl-Hanser-Verlag Munich 1969, page 118 et seq.

The amount of component C) in the molding materials is from 1 to 70, preferably from 5 to 50, particularly preferably from 8 to 40, % by weight, based on the sum of the components A), B) and C). Component C) is a copolymer which consists of $c_1$) from 30 to 90, preferably from 40 to 80, particularly preferably from 45 to 70, % by weight of styrene and/or α-methylstyrene, $c_2$) from 10 to 70, preferably from 20 to 60, particularly preferably from 30 to 55, % by weight of butadiene and $C_3$) from 0 to 20, preferably from 0 to 10, % by weight of one or more further monomers, in which all or virtually of the olefinic double bonds have been hydrogenated.

Suitable components $C_3$) are all compounds which are capable of undergoing anionic polymerization, and mixtures thereof, in particular isoprene, alkyl methacrylates, eg. methyl methacrylate and tert-butyl methacrylate, α-methylstyrene, dimethylbutadiene, and particularly preferably styrenes substituted in the nucleus and 1,1-diphenylethylene.

The copolymers C) are known and some of them are also commercially available (eg. Kraton® from Shell Chemicals and Glissoviscal® from BASF) and are obtainable in a manner known per se.

The copolymers are preferably prepared by the anionic polymerization method in solution, suitable initiators being mainly organometallic compounds, for example sec-butyllithium. As generally desired, the anionic polymerization gives polymers which are essentially straight-chain. If a mixture of styrene and butadiene is subjected to the polymerization, polymers having a characteristic distribution of the monomer units are obtained, depending on the copolymerization conditions chosen.

As a rule, block copolymers in which one chain end is formed by a block of styrene and in which the other chain end is formed by a block of butadiene are preferred. These blocks may be separated from one another by random polymers, and furthermore the blocks may contain minor amounts of units of the other monomer.

Subjecting a mixture of styrene and butadiene to anionic polymerization using one of the stated initiators in the presence of small amounts of an ether, in particular tetrahydrofuran (THF), as a cocatalyst results in the formation of polymer chains in which there are neither blocks nor a completely random distribution of the building blocks but in which the amount of one component increases in one direction along the chain and the amount of the other component decreases in the same direction:

At the beginning of the polymerization, butadiene together with a small amount of styrene is preferably incorporated into the chains being formed. Accordingly, they are butadiene-rich. As the reaction progresses and the content of butadiene monomer in the reaction mixture therefore decreases, an increasing amount of styrene monomers are polymerized, ie. the chain becomes styrene-richer, until finally, after all the butadiene has been consumed, an end segment comprising homopolystyrene is formed. Details of the process are described in DE-A 31 06 959.

Polymers having a star structure which is obtained by linking a plurality of polymer chains, mainly block polymers of the type styrene block/butadiene block/styrene block (three-block polymer), via polyfunctional molecules are also suitable. Suitable linking agents are, for example, polyepoxides, such as epoxidized linseed oil, polyisocyanates, such as benzo-1,2,4-triisocyanate, polyketones, such as 1,3,6-hexanetrione, and polyanhydrides, as well as dicarboxylic esters, such as diethyl adipate, and silicon halides, such as $SiCl_4$, metal halides, such as $TiCl_4$, and polyvinylaromatics, such as divinylbenzenes. Further details on the preparation of these polymers are to be found, for example, in DE-A 26 10 068.

The stated polymers C) may also contain further monomers $c_3$) as polymerized units, the compounds stated for $c_3$) and capable of undergoing anionic polymerization being suitable for this purpose.

Suitable solvents are anhydrous liquids, such as alkanes and cycloaliphatic and aromatic hydrocarbons. Cyclohexane is preferably used.

The anionic polymerization is preferably carried out at from −20° to 150° C.

The reaction is terminated in a manner known per se by adding a polar compound, such as water or an alcohol.

The hydrogenation of the olefinic double bonds which are still present in the polymer and originate from butadiene is likewise carried out in a manner known per se, preferably in the homogeneous phase with hydrogen by means of a soluble, selective hydrogenation catalyst, such as a mixture of nickel(II) acetylacetonate and triisobutylaluminum, in an inert solvent, such as hexane. The hydrogenation temperature is preferably from 20° to 200° C., and a hydrogen pressure of from 6 to 30 bar is recommended. Complete hydrogenation of the nonaromatic double bond is not required; instead, a degree of hydrogenation of 95% is sufficient. Further details on the hydrogenation are to be found, for example, in the abovementioned DE-A 31 06 959.

Working up to give the desired polymers, whose molecular weight is preferably from 50,000 to 200,000, in particular from 70,000 to 120,000, is carried out in a conventional manner.

In the case of the polymers having a homopolystyrene terminal block, the amount thereof in component C) is from 5 to 30, preferably from 7 to 25, % by weight.

In addition to the components A), B) and C), the thermoplastic molding materials may also contain additives, such as lubricants and mold release agents, pigments, dyes, flameproofing agents, antioxidants, light stabilizers, fibrous and pulverulent fillers and reinforcing materials and antistatic agents, in the amounts usual for these materials. Particularly where films are produced from the novel molding materials, plasticizers are concomitantly used, for example copolymers having an average molecular weight of from 2000 to 8000 and comprising from 30 to 70% by weight of ethylene oxide and from 70 to 30% by weight of 1,2-propylene oxide, in amounts of from 0.5 to 10% by weight, based on the sum of the components A), B) and C).

The preparation of the novel molding materials can be carried out by mixing methods known per se, for example with melting in an extruder, a Banbury mixer, a kneader, a roll mill or a calender. However, the components may also be mixed at room temperature without melting, and the pulverulent mixture or the mixture consisting of granules is not melted and homogenized until the processing stage.

Moldings of all types, in particular films, can be produced from the molding materials. The films can be produced by extrusion, rolling, calendering and other methods known to the person skilled in the art. The novel molding materials are shaped into a processable film by heating and/or friction alone or with the comcomitant use of plasticizing or other additives. Such films are processed to finished products by, for example, thermoforming or deep drawing.

The films have a wide range of potential uses, in particular in the automotive industry for the design of car interiors, for decorative purposes, as imitation leather in the production of suitcases and purses and in the furniture industry as covering material for lamination with furniture surfaces.

The novel thermoplastic molding materials contain no halogen. They are very substantially free of components which are expelled by evaporation or exudation and exhibit virtually no disadvantageous changes, such as discolorations, during processing. In particular, they have excellent resistance to heat aging and lightfastness as well as good mechanical properties, even without the concomitant use of appropriate stabilizers and other additives.

EXAMPLES

The following components were prepared (all percentages are by weight).

Preparation of a component A:
Particulate graft polymer comprising crosslinked poly-n-butyl acrylate (core) and styrene/acrylonitrile copolymer (shell)

A mixture of 98 g of n-butyl acrylate and 2 g of dihydrodicyclopentadienyl acrylate and, separately from this, a solution of 1 g of sodium $C_{12}$–$C_{18}$-paraffinsulfonate in 50 g of water were added in the course of 4 hours at 60° C. to a mixture of 3 g of a polybutyl acrylate seed latex, 100 g of water and 0.2 g of potassium persulfate. The polymerization was then continued for a further 3 hours. The median particle diameter $d_{50}$ of the resulting latex was 430 nm, the particle size distribution being narrow (Q=0.1).

150 g of this latex were mixed with 60 g of water, 0.03 g of potassium persulfate and 0.05 g of lauroyl peroxide, after which first 20 g of styrene and then, in the course of a further 4 hours, a mixture of 15 g of styrene and 5 g of acrylonitrile were grafted onto the latex particles in the course of 3 hours at 65° C. Thereafter, the polymer was precipitated with calcium chloride solution at 95° C., isolated, washed with water and dried in a warm air stream. The degree of grafting of the polymer was 35% and the particles had a median diameter $d_{50}$ of 510 nm.

The graft polymer had the following composition (rounded values): 60% by weight of a graft core comprising crosslinked polybutyl acrylate, 20% by weight of an inner graft comprising styrene polymer and 20% by weight of an outer graft comprising styrene/acrylonitrile copolymer in a weight ratio S/AN of 3:1.

The initially used seed polymer was prepared by the process of EP-B 6503 (column 12, line 55, to column 13, line 22), by polymerization of n-butyl acrylate and tricyclodecenyl acrylate in aqueous emulsion and had a solids content of 40%.

The median particle size mentioned in the description of component A) is the weight average of the particle sizes.

The median diameter corresponds to the $d_{50}$ value; accordingly, 50% by weight of all particles have a diameter smaller than the diameter corresponding to the $d_{50}$ value and 50% by weight have a diameter larger than the diameter corresponding to the $d_{50}$ value. In order to characterize the width of the particle size distribution, the $d_{10}$ and the $d_{90}$ values are often stated in addition to the $d_{50}$ value. 10% by weight of all particles are smaller, and 90% by weight larger, than the $d_{10}$ diameter. Similarly, 90% by weight of all particles have a smaller diameter, and 10% by weight a larger diameter, than the diameter corresponding to the $d_{90}$ value. The quotient $Q=(d_{90}-d_{10})/d_{50}$ is a measure of the width of the particle size distribution. The smaller Q, the narrower is the distribution.

Preparation of a component B:
Copolymer of styrene and acrylonitrile

A copolymer of 65% by weight of styrene and 35% by weight of acrylonitrile (component B-1) or 81% by weight of styrene and 19% by weight of acrylonitrile (component B-2) was prepared by the continuous solution polymerization method, as described in Kunststoff-Handbuch, editors R. Vieweg and G. Danmiller, Vol. V Polystyrol, Carl-Hanser-Verlag Munich 1969, pages 122–124. The viscosity number VN (determined according to DIN 53 726 at 250° C. and 0.5% strength by weight solution in dimethylformamide) was 80 ml/g (B-1) or 100 ml/g (B-2).

Preparation of a component C:
Hydrogenated styrene/butadiene copolymer

First, sec-butyllithium was slowly added at 0° C. to a solution of 520 g of styrene, 480 g of butadiene and 20 ml of tetrahydrofuran in 4 l of cyclohexane, in order thus to deactivate proton-active impurities. After initiation of the polymerization reaction, which was evident from a temperature increase of 0.2° C., 0.8 g of sec-butyllithium was immediately added. The heat of polymerization was removed by evaporative cooling. The cooling power was adjusted to that the temperature increased to 120° C. in the course of 30 minutes. This temperature was maintained for a further 10 minutes, after which the polymerization was terminated by adding 1 g of ethanol.

For the hydrogenation, a suspension of 1.5 g of nickel(II) acetylacetonate in 30 ml of toluene and 34 ml of a 20% strength by weight solution of triisobutylaluminum in hexane were added to the resulting polymer solution, after which it was subjected to a hydrogen pressure of 15 bar for 60 minutes at from 80 to 110° C.

The reaction mixture was worked up in the usual manner to obtain the hydrogenated polymer, the solvent advantageously being removed in a direct devolatilization unit.

The styrene content of the resulting polymer, which is commercially available as Glissoviscal® SG (from BASF), was 52% by weight, based on the total weight of the polymer. The amount of homopolystyrene terminal block in the polymer was 13% by weight. The average molecular weight of the product prepared in the manner described was 80,000, determined by gel permeation chromatography.

Novel materials and their properties

Blends were prepared from the components A, B-1 or B-2 and C and were processed at 200° C. on a roll mill to give 1 mm thick films.

The following film properties were determined:

Tensile strength: the tensile test was carried out according to DIN 53 504 on strips which were punched out of the film.

Elongation at break: the elongation on application of a tensile force was determined according to DIN 53 504 in a tensile test and was stated as a % of the original dimension of the strip.

Tear propagation strength: a tear propagation test according to DIN 43 515 was carried out on punched-out strips.

Shore hardness: the Shore hardness was determined according to DIN 43 505 using tester D.

Heat distortion resistance: this was determined according to DIN 53 460 as the Vicat number by measuring method A.

The compositions of the films produced and the test results are listed in Table 1.

TABLE 1

| Test No. | 1 | 2 | 3 *) | 4 | 5 | 6 |
|---|---|---|---|---|---|---|
| Composition [% by weight]: | | | | | | |
| Component A | 40 | 40 | 80 | 70 | 70 | 70 |
| Component B-1 | 40 | 40 | 10 | 20 | 15 | 10 |
| Component C | 20 | 20 | 10 | 10 | 15 | 20 |
| Properties: | | | | | | |
| Tensile strength [N/mm$^2$] | 18 | 19.6 | 15 | 15.9 | 13.5 | 11 |
| Elongation at break [%] | 43 | 84 | 169 | 138 | 161 | 172 |
| Tear propagation strength [N/mm$^2$] | 78 | 96 | 44 | 60 | 48 | 40 |
| Shore D hardness | 57 | 55 | 45 | 49 | 45 | 42 |
| Heat distortion resistance: Vicat A [°C.] | 102 | 94 | 85 | 96 | 88 | 73 |

*) also contains 2% by weight of a copolymer of 60% by weight ethylene oxide and 40% by weight of propylene oxide (Separol ® CF 22 from BASF) as a plasticizer.

The resistance to heat aging was likewise determined on strips which were punched out of 1 mm thick films. The strips were subjected to heat storage for 300 and 500 hours. A tensile test according to DIN 53 504 was carried out to determine the tensile strength and the elongation at break.

For comparison, the tensile test was carried out on strips which were not subjected to heat storage.

In addition, the color change after heat storage was visually estimated.

Table 2 summarizes the composition of the films produced and the test results.

TABLE 2

| Test No. | 7 | 8 |
|---|---|---|
| Composition [% by weight]: | | |
| Component A | 77 | 77 |
| Component B-1 | 13 | 0 |
| Component B-2 | 0 | 13 |
| Component C | 10 | 10 |
| Properties: | | |
| Shore D hardness | 47 | 48 |
| Heat distortion resistance: Vicat A [°C.] | 91 | 95 |

TABLE 2-continued

| Test No. | 7 | | | 8 | | |
|---|---|---|---|---|---|---|
| Duration of heat storage [h] | 0 | 300 | 500 | 0 | 300 | 500 |
| Tensile strength *) [N/mm$^2$] | 15.0 | 14.8 | 14.5 | 14.0 | 14.5 | 14.3 |
| Elongation at break *) [%] | 139 | 130 | 116 | 139 | 137 | 132 |
| Color change *) | — | none | slight | — | none | slight |

*) after heat storage

We claim:

1. A thermoplastic molding material consisting essentially of

A) from 30 to 98% by weight of a graft polymer of
  $a_K$) from 30 to 98% by weight of an elastomeric graft core, obtained by polymerization of
    $a_K/1$) from 80 to 99.99% by weight of a $C_1$–$C_{10}$-alkyl ester of acrylic acid,
    $a_K/2$) from 0.01 to 20% by weight of a crosslinking monomer, and
    $a_K/3$) from 0 to 40% by weight of one or more further monomers, and
  $a_S$) from 10 to 70% by weight of a graft shell comprising
    $a_S/1$) from 50 to 100% by weight of a styrene compound of the formula

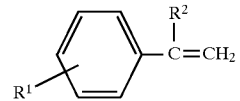

where $R^1$ and $R^2$ are each hydrogen or $C_1$–$C_8$-alkyl or of a $C_1$–$C_8$-alkyl ester of acrylic acid or methacrylic acid, and
    $a_S/2$) from 0 to 50% by weight of one or more further monomers, B) from 1 to 50% by weight of a thermoplastic polymer of
  $b_1$) from 50 to 100% by weight of styrene or α-methylstyrene,
  $b_2$) from 0 to 50% by weight of acrylonitrile, and
  $b_3$) from 0 to 50% by weight of one or more further monomers, and C) from 1 to 70% by weight of a copolymer of
  $c_1$) from 30 to 90% by weight of styrene or α-methylstyrene,
  $c_2$) from 10 to 70% by weight of butadiene, and
  $c_3$) from 0 to 30% by weight of one or more further monomers, in which 95% or more of the olefinic double bonds in said copolymer have been hydrogenated,
  wherein said copolymer
  i) is a block copolymer in which one chain end is formed by a block of styrene and in which the other chain end is formed by a block of butadiene, wherein the blocks may be separated from one another by random polymers of styrene and butadiene, and wherein the styrene block may contain minor amounts of butadiene, and where the butadiene block may contain minor amounts of styrene, or ii. is a polymer which, starting from a butadiene-rich segment, exhibits along the chain an increasing styrene content and ends in a homopolystyrene end segment.

2. The thermoplastic molding material as claimed in claim 1, in which the copolymer of component C) was prepared from the monomers $c_1$) to $c_3$) of component C) by anionic polymerization.

3. A thermoplastic molding material as claimed in claim 2, in which the anionic polymerization for the preparation of the copolymer of component C) was carried out with the aid of an alkyllithium compound and in the presence of tetrahydrofuran.

4. A thermoplastic molding material as claimed in claim 2, in which the component B is a copolymer of from 75 to 95% by weight of styrene and from 5 to 25% by weight of acrylonitrile.

5. A thermoplastic molding material as claimed in claim 1, containing, in addition to the components A) to C), from 0.5 to 10% by weight of a copolymer having an average molecular weight of from 2000 to 8000 and comprising from 30 to 70% by weight of ethylene oxide and from 70 to 30% by weight of 1,2-propylene oxide wherein said average molecular weight range is valid for number average, weight average, centrifuge average, and viscosity average.

6. A leatherlike, flexible film or molding comprising a thermoplastic molding material as claimed in claim 1.

7. An automotive interior part comprising a thermoplastic molding material as claimed in claim 1.

8. A thermoplastic material as claimed in claim 2, in which the proportion of the homopolystyrene end segment of the polymers defined under ii) is from 5 to 30% by weight.

* * * * *